July 26, 1949.  A. L. M. A. ROUY  2,477,208
COLORIMETER

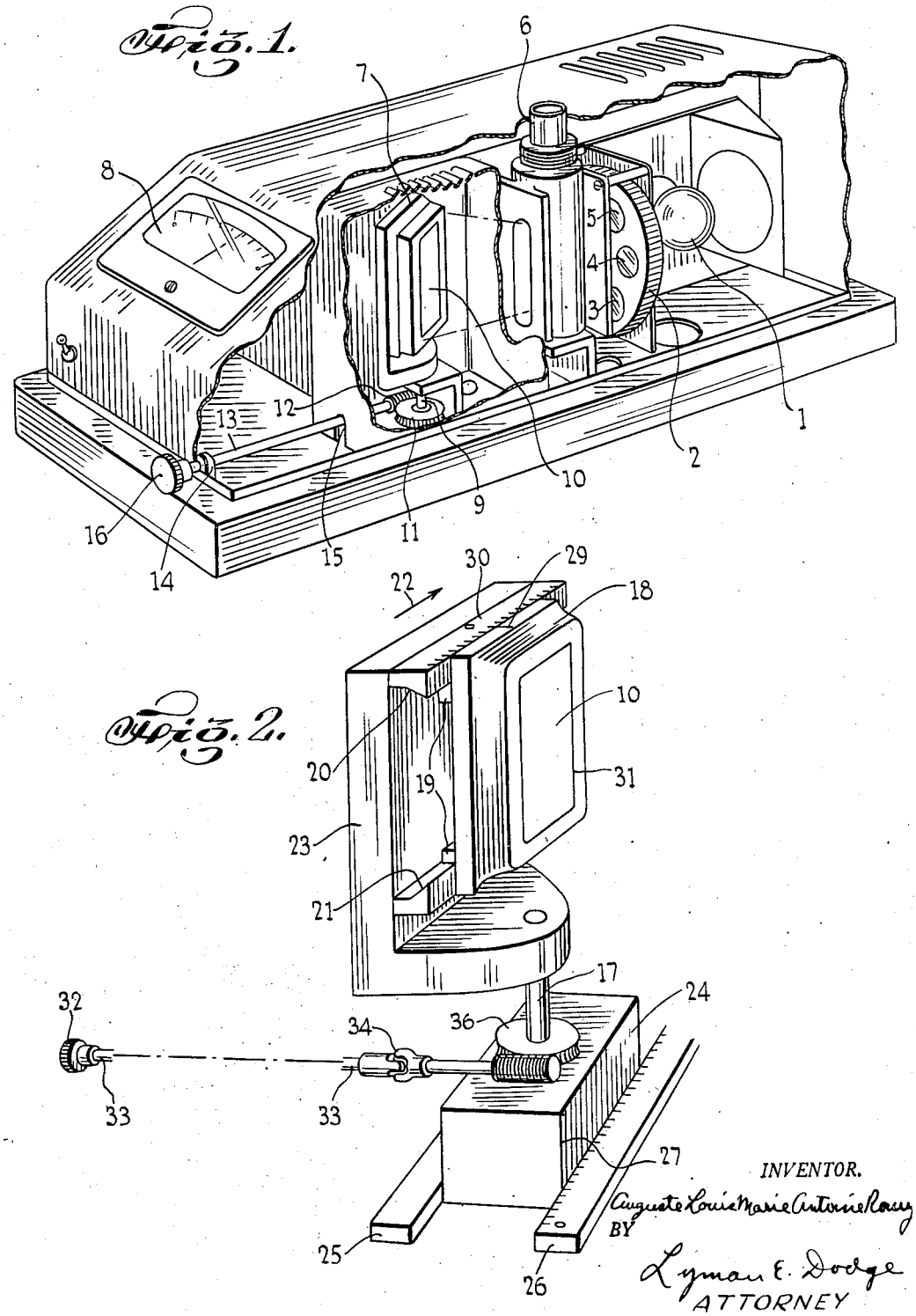

Filed May 3, 1946

INVENTOR.
Auguste Louis Marie Antoine Rouy
BY
Lyman E. Dodge
ATTORNEY

Patented July 26, 1949

2,477,208

UNITED STATES PATENT OFFICE 2,477,208

COLORIMETER

Auguste Louis Marie Antoine Rouy,
New York, N. Y.

Application May 3, 1946, Serial No. 666,925

4 Claims. (Cl. 250—41.5)

This invention relates to photoelectric colorimeters.

A principal object of this invention is to provide a construction of photoelectric colorimeter including a microammeter of a given range whereby adjustments may be made so that when light is passed through a salt solution of zero concentration the electrical variation in the light sensitive receiving means will not be such as to be beyond the range of the microammeter and at the same time may be the maximum for the microammeter.

Other objects and advantages will appear as the description of the particular physical embodiment selected to illustrate the invention progresses and the novel features will be particularly pointed out in the appended claims.

Figure 3:
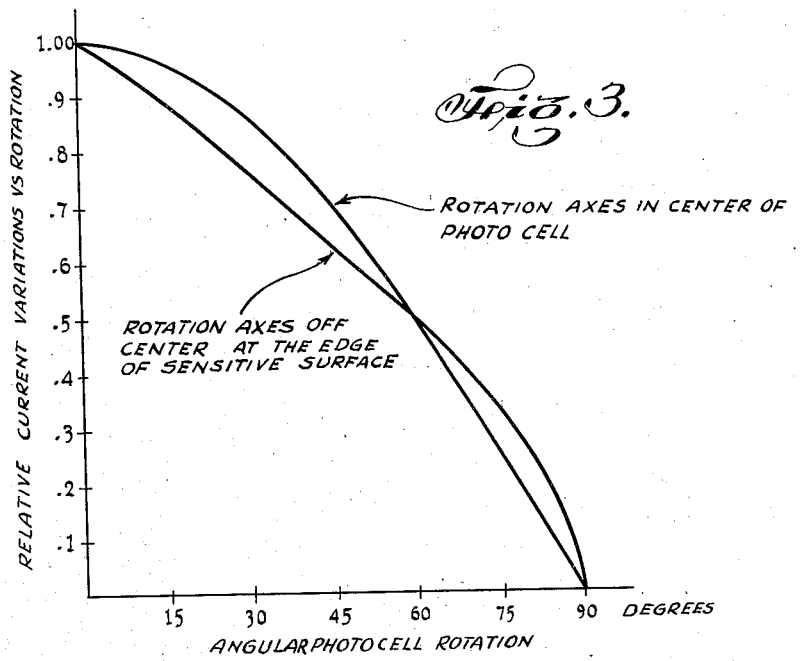
Figure 4:
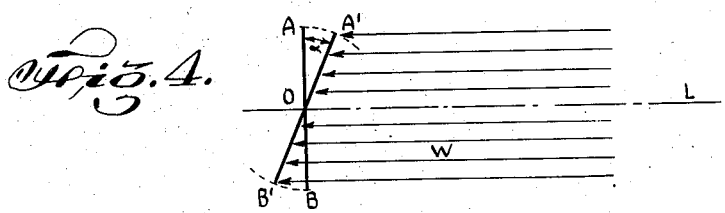
Figure 5:
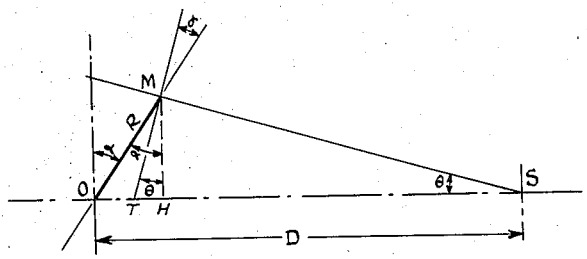
Figure 6:
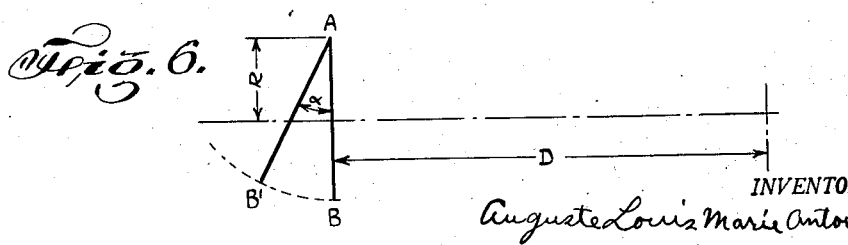

In describing the invention in detail and the particular physical embodiment selected to illustrate the invention, reference will be had to the accompanying drawings and the several views thereon, in which like characters of reference designate like parts throughout the several views, and in which:

Fig. 1 is a perspective drawing illustrating a photoelectric colorimeter with my invention applied thereto; Fig. 2 is a perspective view of a modified form of photocell and adjusting mechanism; Fig. 3 is a plot showing angular photocell rotation as abscissae and corresponding current variations as ordinates and showing the resulting relations when the rotative axis is either at the center of the photocell or at the edge thereof; Fig. 4 is a diagram illustrating the conditions when the photocell is rotated on a central axis; Fig. 5 is a diagram also showing conditions when the photocell is rotated on a central axis when a diverging light beam is used; Fig. 6 is a diagram illustrating conditions when the photocell is rotated on an axis at one edge of the sensitive surface.

A photoelectric colorimeter generally includes a microammeter of a limited capacity so that when using different filters for various colored solutes in solvents, the relative light absorptions vary so greatly that the light absorption for a particular specific substance of zero concentration by reason of the particular filter used may be such that the photocell will be so electrically varied by the light falling thereon that the capacity of the microammeter will be exceeded. It is necessary, consequently, to provide a means by which, even at zero concentration of any particular salt solution, the microammeter reading will not exceed the scale, that is, the microammeter indicating hand will not be forced beyond the highest reading of the scale of the microammeter. Further, the means should enable an operator to make adjustments so that, in the case of any particular colored solute at zero concentration in any particular solvent a maximum reading on the microammeter may be obtained.

A particular preferred form of apparatus which I use to secure an adjustment so that notwithstanding variations of light intensity, I may secure an electrical variation of my photocell, so that with zero concentration of absorbing medium I will not exceed the highest point of the scale of my microammeter, but will, at the same time, secure a maximum reading within the range of my microammeter, is shown in Fig. 1.

Fig. 1 shows, schematically, a source of light 1; a filter carrier 2 with various colored filters as 3, 4 and 5 therein; a vessel 6 for containing a light absorbing medium; a photocell 7 and a microammeter 8. Light from the source 1, after passing through a filter as 3, 4 or 5, then passes through the absorbing medium in the containing vessel 6 and impinges upon the photoelectric cell 7 and generates an electrical disturbance which is indicated by the microammeter 8. By the showing, I do not mean to exclude a construction in which the filter is between the photoelectric cell and the absorbing medium.

If a solution of zero concentration is contained in the containing vessel 6, then the maximum intensity of light energy from the source 1 impinges upon the photocell 7 and so generates the maximum of electrical variation and causes the very highest reading on microammeter 8. The reading may be so high that the indicating hand will move off the dial.

My method for regulating the amount of electrical variation in photocell 7 is to provide a pivot 9 for the photocell 7 upon which the photocell may be oscillated. This pivot 9 is positioned in the geometrical plane of the sensitive surface 10 of the photocell. The pivot shaft 9 is secured to a worm wheel 11. Meshing with the worm wheel 11 is a worm 12 secured to the rod 13 suitably journaled, as at 14 and 15, and bearing a thumb piece 16. In the form shown by Fig. 1, the axis of the pivot 9 is not only positioned in the geometrical plane of the sensitive surface 10 of the photocell 7 but is also in the line bisecting the sensitive surface 10.

The geometrical center of the surface 10 is positioned on the axis of the light beam issuing from the source of light 1.

By the above construction, I may position the sensitive surface 10 of the photocell 7 precisely at a right angle to the axis of the light emanating from the source 1. In such position a maximum electrical variation in the photocell is caused. If this is too great, by turning knob 16, I may rotate photocell 7, more or less, until the reading on my microammeter is a maximum for the scale of a given microammeter when the absorbing medium in container 6 is of zero concentration. By such means, I not only adjust my light intensity so that electrical variations caused thereby come within the range of the microammeter which I use, but I also arrange so that I will have a maximum reading with zero concentration of absorbing medium.

It is necessary at all times to have the geometrical center of the sensitive surface in the axis of the light beam from the source 1 when the sensitive surface is at a right angle to the axis of the beam, but it is not necessary to have the pivot axis pass through the geometrical center of the sensitive surface. I may position my pivot axis off center, even to the extreme of placing it on either the right or left hand edge of the sensitive surface.

In Fig. 2, I diagrammatically indicate a construction in which the axis of the pivot may be positioned anywhere along the width of the sensitive surface. In Fig. 2, 10 designates the sensitive surface and 17 designates the pivot or axis.

Any suitable or appropriate means may be used to support the photocell so that it may be oscillated on an axis varying from one extreme edge to the other extreme edge, but a preferred form is shown in Fig. 2.

In Fig. 2 the photocell 18 is provided with guide strips 19 on the back thereof which engage with and slide in the guideways 20 and 21, so that the photocell 18 may be moved in the direction of the arrow 22 or opposite thereto. The guideways 20 and 21 are suitably attached to a carrying frame 23 which is attached to a pivot 17, and the pivot 17 rests in and is supported by the pivot block 24. The pivot block 24 can slide back and forth in the same direction as the photocell 18 and is conveniently guided by guide bars 25 and 26. When the edge 27 is in alignment with the zero line of the scale 28 and the reference line 29 on the photocell is opposite the zero mark on the guide 20, the geometrical center of the sensitive surface 10 is positioned on the axis of the light beam. Under such conditions the photocell 18 can be oscillated on the pivot 17, the axis of which passes directly through the geometrical center of the sensitive surface 10 and in the plane of the surface.

If it is desired to oscillate the photocell 18 on an axis other than one through the geometrical center thereof, then the pivot block 24 would be moved in the desired direction and the amount by which the block 24 is moved in one direction would indicate the amount by which photocell 18 would be moved in the opposite direction so as to bring the geometrical center of the sensitive surface in the axis of the light beam. The usual desire would be to place the axis of the pivot 17 in the extreme edge of the sensitive surface 10, that is, for instance, edge 31.

After the photocell has been adjusted so that its geometric center is in the axis of the light beam, then it could be oscillated a desired amount by operation of finger piece 32 which, through the rod 33 and the universal joint 34 and worm 35, would oscillate worm wheel 36 secured to pivot 17.

It is to be understood that although I have shown a vertical axis pivot 17, I do not mean to exclude a horizontal axis pivot.

My method of varying the amount of electrical variation caused by the photocell, with a parallel beam of light, causes no complications or inaccuracies because the intensity of light falling on the photocell varies directly with the cosine of the angle of oscillation or rotation when the axis of rotation passes through the geometrical center of the sensitive surface.

When converging or diverging light beams are used, the total current output also substantially follows the cosine law, but there are deviations. The deviations are illustrated by Fig. 3.

When a constant source of light is used with a converging or diverging beam and the photocell is rotated on an axis passing through its geometrical center, the curve showing the angular photocell rotation plotted against relative current variations is shown in Fig. 3. It will be noticed that the function is linear for all angular photocell rotations from 45 to 90.

When the rotation axis is at the edge of the sensitive surface the plotted curve shows that the function is substantially linear for about 0° rotation to about 70° rotation.

Ordinates are shown designating the relative filter energy transmission. From these it will be seen that for filters where the energy transmission is from about 100% down to about 30% it is best to rotate the photocell on a center pivot, but where the filter is such that transmission is from 0 to about 60% it is best to use a rotation off the center, at the edge of the sensitive surface.

When using a converging or diverging light beam, if the variation does not exceed a given amount, it is negligible. In order to determine whether with a converging or diverging beam in any particular case, the variation is within the allowable limits, it is necessary to consider the mathematical relations.

If a parallel beam of light falls upon a photocell surface AB rotatable about an axis perpendicular to a light beam axis OL, as shown in Fig. 4, the illumination of the surface AB may be considered as having a density $\sigma$ per unit of surface area, so that if S is the total surface and W is the total light flux energy impinging on the photocell, the mathematical expression thereof will be $S\sigma = W$.

If now the surface AB is rotated through the angle $\alpha$ on an axis perpendicular to the light beam axis OL a new surface density $\sigma_1$ will be obtained so that the equation expressing the relations between $\sigma$ and $\sigma_1$ would be $$\sigma_1 = \sigma \cos \alpha$$

As $\alpha$ may vary from 0° to 90° the cosine varies from 1 to 0, therefore the total energy falling on the surface S could be expressed as follows:

$$W_1 = \int_0^S \sigma \cos \alpha \, dS$$

The surface AB remaining constant and equal to S, then $$W = \sigma S \cos \alpha$$

The above equation represents the light energy falling on a given surface S in terms of that surface and the cosine of the angle of rotation. The above mathematical treatment shows that when a parallel beam of light is used in photo colorimetry, the light energy impinging on a photocell can be properly adjusted from the full range of maximum intensity to zero value by a rotation of the photocell around an axis perpendicular to the axis of the beam.

If either a converging or diverging light beam is used instead of a parallel beam, the total current output also follows the cosine law.

Consider the case of a diverging light beam Fig. 5 issuing from the source S located at a distance D from the photocell center O. If we consider the light energy falling on the point M of the photocell surface making an angle $\alpha$ with the general axis OS, this light energy for the elementary surface $dS$ located in M may be expressed by the equation:

$$dE = \frac{E_0}{\overline{SM}^2} \cos \gamma \, dS$$

The elementary surface $dS$ is equivalent to $dS = l\,dR$ where $l$ is the length of the photocell surface and $dR$ an elementary increase of its width along $\overline{SM} = R$.

Therefore I have to express the value of $\overline{SM}$ and $\cos \gamma$ in function of: R, $\alpha$ and D; an operation which does not present any difficulty using the diagram, Fig. 5.

I finally obtained the general differential equation:

(1) $\quad dE = E_0 Dl \cos \alpha \dfrac{dR}{(R^2 + D^2 - 2DR \sin \alpha)^{3/2}}$ The total light energy falling on the sensitive surface being given by:

$$E = E_0 Dl \cos \alpha \int_{-R}^{+R} \frac{dR}{(R^2 + D^2 - 2DR \sin \alpha)^{3/2}}$$

in which R is the only variable for a specified value $\alpha$.

The value of the integer above is readily calculated and yields the general equation of the light intensity variation in function of the angle $\alpha$ of rotation.

Therefore the total current produced, I, by the photocell when rotating about an axis perpendicular to the general light beam axis is given by:

(2) $\quad I = KE_0 Dl \cos \alpha \left[ \dfrac{-1}{(R^2 + D^2 - 2DR \sin \alpha) + (R - D \sin \alpha)\sqrt{R^2 + D^2 - 2DR \sin \alpha}} \right]_{-R}^{R}$ Performing the indicated calculations for the specific case where $D = 10$ cms. and $R = 1$ cm. along the different values of the angle $\alpha$ varying from 0° to 90°, I obtain for the quantity between parenthesis a constant value.

$a = .002$ whatever might be the angle $\alpha$

Therefore, the current I will vary exactly as a function of the angle $\alpha$ cosine.

The Equation 2 being general still holds for the particular case where the axis of rotation of the photocell is not located in the center but placed off center; for instance at the edge of the sensitive layer surface, see Fig. 6, where the rotation axis is in A, offset from the center by the quantity R. The current equation in that case is given by:

(3) $\quad I = KE_0 Dl \cos \alpha \left[ \dfrac{1}{(R^2 + D^2 + 2RD \sin \alpha) - (R + D \sin \alpha)\sqrt{R^2 + D^2 + 4D \sin \alpha}} - \dfrac{1}{D^2(l - \sin \alpha)} \right]$ In the above equation the symbols indicate quantities as follows:

I = Intensity in microamperes
K = Coefficient of sensitivity of photocell
$E_0$ = Light source intensity in candles
D = Distance in centimeters of center of photocell to light source or image
$l$ = Perpendicular length in centimeters of photocell
$\alpha$ = Angle made by photocell with plane at right angle to line between center of photocell and source
R = Distance in centimeters of edge of photocell to center.

Calculating the values for the different angular positions, we obtain the two different curves as shown by Fig. 3.

The allowable limit of variation of density of light intensity between one extreme edge of the photocell and the other extreme edge of the photocell when the photocell is positioned at an angle to the axis of the light beam should not exceed 20%, that is plus or minus 10% between either extreme edge and the center. If we consider the remote edge as a plus R and the inner edge as a minus R as regards distance from the light source, and consider 20% as our maximum allowable variation of light intensity density, we may immediately write the equation based on Equation 1 in the following manner:

$$0.20 \geq \frac{\dfrac{1}{(R^2 + D^2 - 2DR \sin \alpha)^{3/2}} - \dfrac{1}{(R^2 + D^2 + 2DR \sin \alpha)^{3/2}}}{1/D^3}$$

The symbols in the above equation designate the same quantities as indicated in the Equation 3.

If the above calculation shows that the variation does not exceed 20% the set up of the photoelectric cell is satisfactory. If the calculation shows more than 20% then the set up would not be suitable for use and some other change must be made such as changing to a parallel beam of light or using the photoelectric cell with the sensitive surface more nearly at a right angle to the axis of the light beam.

Although I have particularly described one particular physical embodiment of my invention, nevertheless I desire to have it understood that the form selected is merely illustrative and does not exhaust the possible physical embodiments of the idea of means underlying my invention.

What I claim as new and desire to secure by Letters Patent is:

1. In a photoelectric colorimeter of the type including a source of light, a filter, means for containing a light absorbing medium interposed in the light beam from the source, a microammeter for quantitatively registering the effect of the light beam on a photoelectric cell, characterized by the combination therewith of a photoelectric cell mounted on an axis perpendicular to the axis of the beam from the source with the cell axis positioned in the geometrical plane of the light sensitive surface of the cell and a manually operable means for oscillating said cell on said cell axis.

2. In a photoelectric colorimeter of the type including a source of light, a filter, means for containing a light absorbing medium interposed in the light from the source, a microammeter for quantitatively registering the effect of the light beam on a photoelectric cell, characterized by the combination therewith of a photoelectric cell provided with a light sensitive surface positioned to receive light which passes through the absorbing medium and the filter from the source, said cell mounted on an axis at a right angle to the axis of the light beam, said axis passing through the geometrical plane of the light sensitive surface of said cell, a member mounted to move in a plane at a right angle to said light beam, said axis mounted on said member, and a manually operable means for rotating said axis whereby the geometrical center of the sensitive surface of the photocell may be positioned in the axis of the light beam and the photocell may be oscillated about the first-mentioned axis.

3. In a photoelectric colorimeter of the type including a source of light, a filter, means for containing a light absorbing medium interposed in the light beam from the source, a microammeter for quantitatively registering the effect of the light beam on a photoelectric cell, characterized by the combination therewith of a photoelectric cell provided with a light sensitive surface positioned to receive light which passes through the absorbing medium and the filter from the source with its geometrical center on the axis of the light beam when the sensitive surface is at a right angle to the light beam; means for supporting said photoelectric cell whereby it may be oscillated on an axis through the geometrical center of the sensitive surface or on an axis passing through the side margin of the sensitive surface or anywhere therebetween, said axis of oscillation always lying in the geometrical plane of the sensitive surface and always being at a right angle to the axis of the light beam and means for oscillating the cell on said oscillating axis.

4. In a photoelectric colorimeter of the type including a source of light, a filter, means for containing a light absorbing medium interposed in the light beam from the source, a microammeter for quantitatively registering the effect of the light beam on a photoelectric cell, characterized by the combination therewith of a photoelectric cell provided with a light sensitive surface positioned to receive light which passes through the absorbing medium and the filter; a pivot, a toothed wheel mounted on the pivot, manual means for oscillating the toothed wheel and so the pivot, a support for the pivot movable at a right angle to the axis of the light beam, a guide strip attached to the cell, cooperating guideways for receiving the guide strips supported by the pivot, the axis of the pivot lying in a line lying in the sensitive surface whereby the cell or the support may be moved in either direction at a right angle to the axis of the beam from the light source and whereby the cell may be oscillated on its axis.

AUGUSTE LOUIS MARIE ANTOINE ROUY.

REFERENCES CITED

The following references are of record in the file of this patent:

UNITED STATES PATENTS

| Number | Name | Date |
|---|---|---|
| 1,739,373 | Race | Dec. 10, 1929 |
| 1,914,322 | Bickley | June 13, 1933 |
| 1,916,356 | Bohner | July 4, 1933 |
| 1,951,523 | Nicolson | Mar. 20, 1934 |
| 2,015,675 | Hays | Oct. 1, 1935 |
| 2,232,169 | Diller | Feb. 18, 1941 |